Figure 3A:
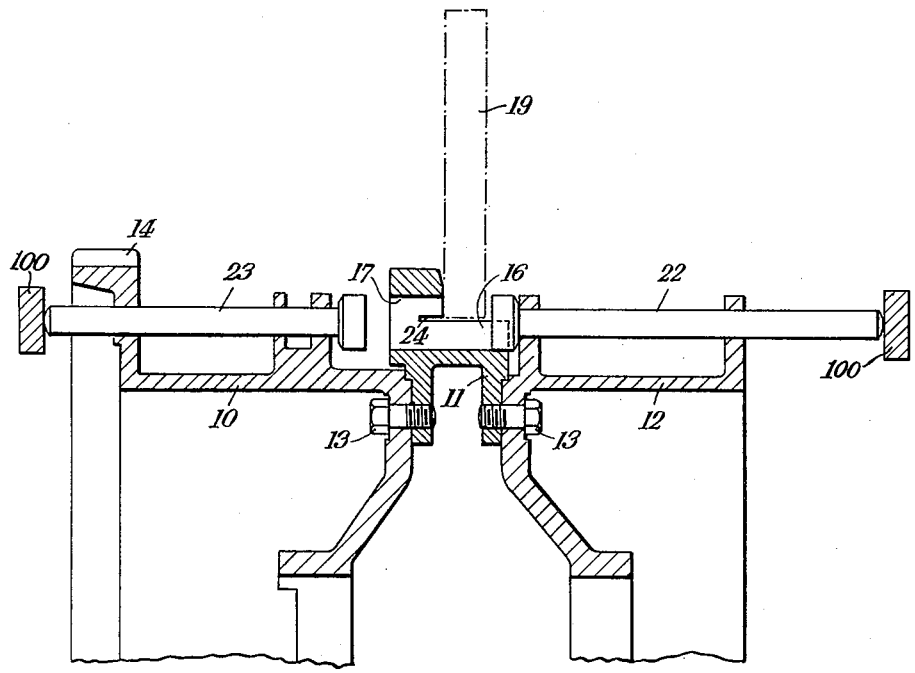

June 6, 1961
L. BROOK
2,987,015
APPARATUS FOR MOULDING SUGAR AND LIKE PLASTIC MATERIALS
Filed Oct. 5, 1959
4 Sheets-Sheet 1
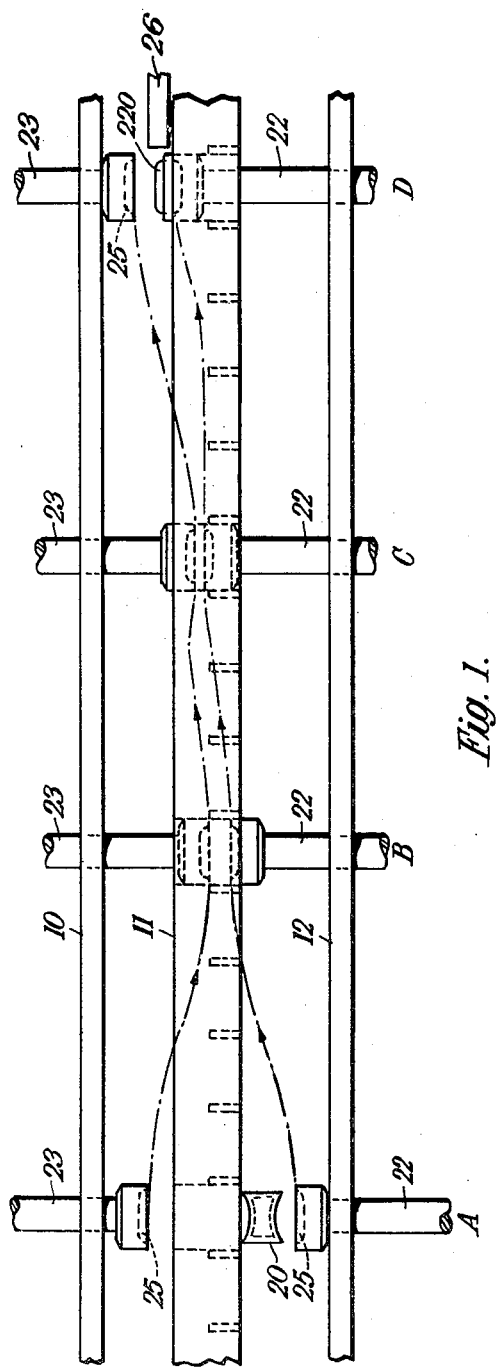
Fig. 1.
Fig. 2C.
Fig. 2B.
Fig. 2A.
INVENTOR
Leonard Brook
By
Watson, Cole, Grindle & Watson
ATTORNEYS June 6, 1961  L. BROOK  2,987,015
APPARATUS FOR MOULDING SUGAR AND LIKE PLASTIC MATERIALS
Filed Oct. 5, 1959  4 Sheets-Sheet 2

INVENTOR
Leonard Brook
By
Watson, Cole, Grindle & Watson
ATTORNEYS

June 6, 1961 L. BROOK 2,987,015
APPARATUS FOR MOULDING SUGAR AND LIKE PLASTIC MATERIALS
Filed Oct. 5, 1959 4 Sheets-Sheet 3

INVENTOR
Leonard Brook
by
Watson, Cole, Grindle & Watson
ATTORNEYS

June 6, 1961 L. BROOK 2,987,015
APPARATUS FOR MOULDING SUGAR AND LIKE PLASTIC MATERIALS
Filed Oct. 5, 1959 4 Sheets-Sheet 4

INVENTORS
Leonard Brook
By Watson, Cole, Grindle & Watson
ATTORNEYS.

ary of Great Britain
United States Patent Office 2,987,015
Patented June 6, 1961

2,987,015
APPARATUS FOR MOULDING SUGAR AND LIKE PLASTIC MATERIALS
Leonard Brook, Bramhope, near Leeds, England, assignor to Baker Perkins Limited, Peterborough, England, a company of Great Britain
Filed Oct. 5, 1959, Ser. No. 844,529
Claims priority, application Great Britain Oct. 10, 1958
3 Claims. (Cl. 107—8)

This invention relates to machines for moulding individual tablets from a rope of sugar or like plastic stock of the type comprising a moulding wheel having a toothed portion, the recesses in which serve for preliminary moulding of the rope, and an adjoining portion containing axially extending moulding cavities, each of which is open at both ends and adjacent to a recess in the toothed portion, a wheel which cooperates with the toothed portion of the moulding wheel to form a rope of hot sugar fed into the machine into a string of roughly shaped tablets which are received by the recesses in the toothed portion of the moulding wheel and remain connected by thin webs of stock, and pairs of cam-operated plungers mounted on the moulding wheel and associated with the moulding cavities therein, the plungers acting to transfer the roughly shaped tablets in succession from the recesses to the moulding cavities, to mould them to shape in the moulding cavities and finally to eject them from the moulding cavities.

In existing machines of this type, one plunger of the pair moves first of all to push the roughly shaped tablet from the recess into the moulding cavity, snapping the webs connecting the tablet to its neighbours, the other plunger then cooperates with the first plunger to mould the tablet to true shape in the cavity and then retires and the first plunger then continues its original movement to eject the tablet and finally withdraws from the cavity.

Each tablet is thus formed in a moulding cavity which is completely closed at the time of moulding by the moulding plungers which have moved into the ends of the cavity. These tablets are known as seamless tablets and are considered to have a better surface finish than tablets which are finish moulded as a string, in which each tablet is joined to its neighbour by a narrow neck of stock, and subsequently separated from the string after cooling.

It has, however, only been possible to form seamless tablets with a machine of the above type from a rope of solid sugar, because the disruptive effect of pushing the roughly shaped tablet from the recess in the toothed part of the moulding wheel into the moulding cavity causes leakage from the end closures of the tablets in the case when the rope has a centre filling of jam or the like.

The invention provides a modified form of machine of the above type which is suitable for moulding soft centred tablets and in which each moulding cavity has at its entry end slots connecting it to its neighbours and extending for part of the length of the cavity, these slots serving to accommodate the webs of stock connecting adjoining roughly shaped tablets as the roughly shaped tablets enter the cavities, and in which the plungers are arranged to apply at least partial compression to the tablets in the moulding cavities while the webs of stock are accommodated in the slots and thereafter to move the tablets further into the cavities to break said webs. The preliminary compression of each tablet prior to its separation from its neighbour causes the sugar to be squeezed in to reinforce the end seals and to concentrate the soft filling more centrally in the tablet.

Figure 3B:
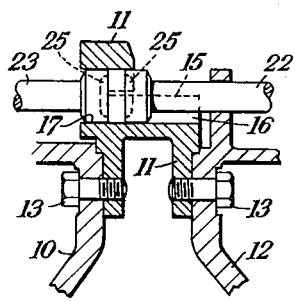
Figure 3C:
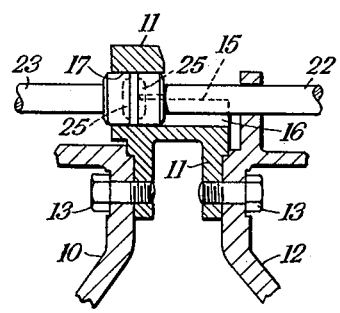
Figure 4:
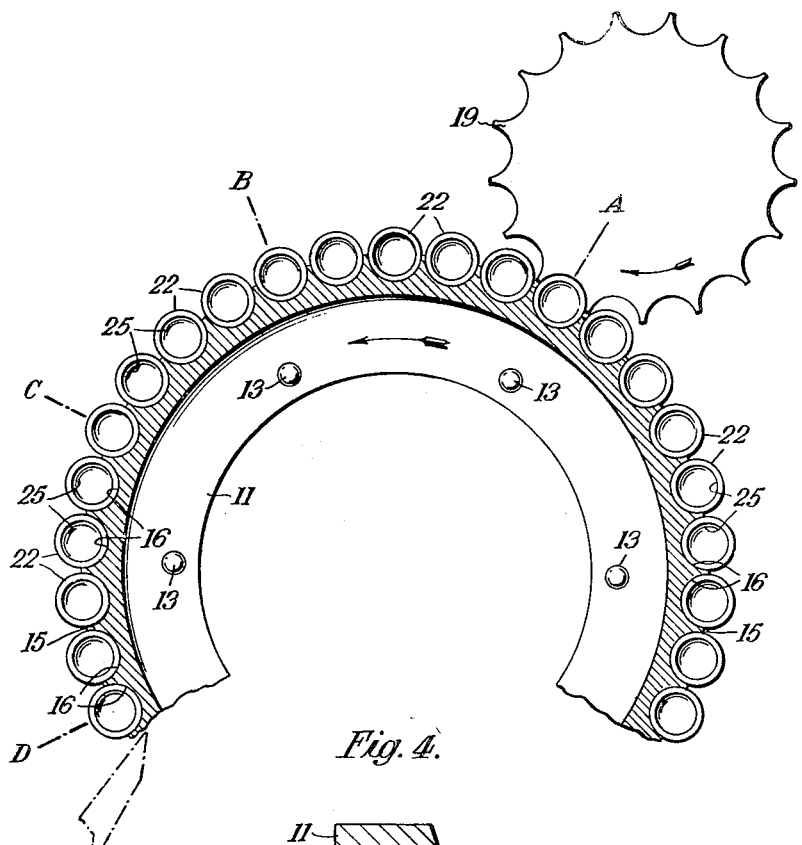
Figure 5:
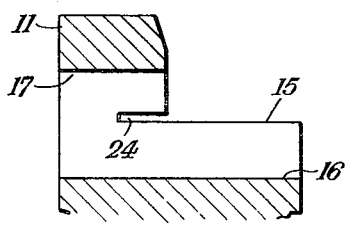
Figure 6A:
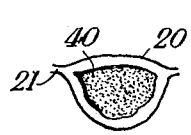
Figure 6B:
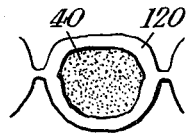
Figure 6C:
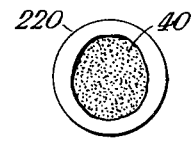
Figure 7A:
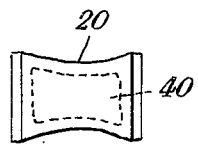
Figure 7B:
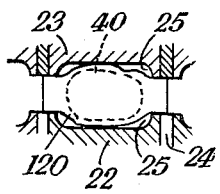
Figure 7C:
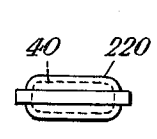
Figure 8:
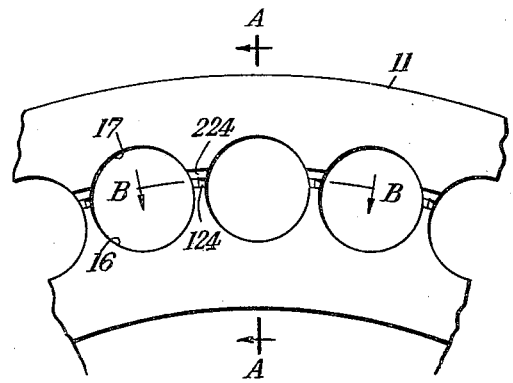
Figures 9, 10:
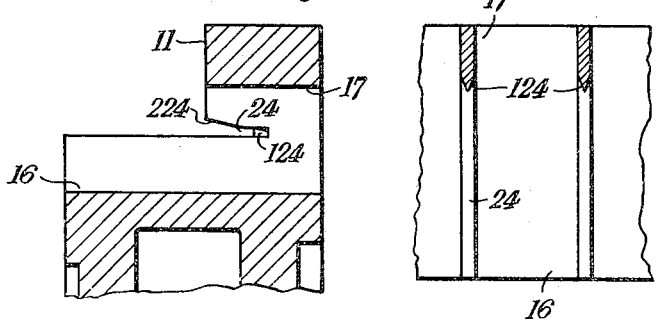

Two embodiments of moulding machine according to the invention will now be described with reference to the accompanying diagrammatic drawings in which:

FIG. 1 is a developed plan view of the moulding wheel of the first embodiment,
FIGS. 2A, 2B and 2C show successive changes in the configuration of the tablet, being longitudinal sections at stations A, B and C,
FIGS. 3A, 3B and 3C are transverse sections at stations A, B and C,
FIG. 4 is a side elevation,
FIG. 5 is an enlarged section through one of the moulding cavities,
FIGS. 6A, 6B and 6C correspond to FIGS. 2A, 2B and 2C but are drawn on a larger scale,
FIGS. 7A, 7B and 7C show the successive changes in configuration of the tablet in plan view,
FIG. 8 is a front elevation of part of the moulding wheel of the second embodiment and
FIGS. 9 and 10 are respectively sections on the lines A—A and B—B in FIG. 8.

Like reference characters indicate like parts throughout the figures.

Referring first to the construction shown in FIGS. 1–7, the moulding wheel is formed of three sections 10, 11, 12 joined by bolts 13, the section 10 being formed with a driving gear 14. The central section 11 is formed with teeth 15 (FIG. 2A) defining between them recesses 16 and also contains a number of closely adjacent axially extending moulding cavities 17, one opposite each of the recesses 16.

A rope 18 of filled sugar is fed at station A, as shown in FIG. 2A, into the nip between the toothed portion of the moulding wheel and a nipping-off wheel 19 which may have a smooth periphery or be toothed, as shown. As the result the rope is formed into a string of partially formed tablets 20 joined by webs of stock 21, the tablets 20 being loosely pressed into the recesses 16 as shown in FIG. 2A.

The moulding wheel carries a series of pairs of moulding plungers 22, 23; one pair for each cavity 17, which are caused to move axially by fixed cams 100, FIGURE 3A, to follow the paths indicated by the arrows in FIG. 1. Each cavity 17 has at each side a milled slot 24, extending for part of its length from its entry end and joining it to the next cavity.

The tablets 20 are moved in succession from the recesses 16 into the cavities 17 by the plungers 22, the connecting webs 21 being accommodated by the slots 24 as the tablets enter the cavities. At station B, each tablet is partially compressed between the plungers 22, 23; the webs 21 remaining unbroken in the slots 24. As a result the tablet is shaped to form 120 shown in FIG. 2B, sugar being squeezed in to reinforce the portions of the tablet adjoining the webs and the filling 40 being compressed towards the centre of the tablet. The tablet is then moved further into the recess to a position, see station C, beyond the ends of the slots 24 and are there finally moulded to the shape 220 (FIG. 2C). The webs, of course, are broken by passage of the tablet past the ends of the slots 24 and as the tablets are completely accommodated at station C in recesses 25 in the ends of the plungers no trace of the severed webs remains. The plunger 23 then retires and the plunger 22 completes its forward movement to the position shown at station D, where the tablet 220 is free to drop from the moulding wheel on to a cooling or carrying conveyor. A fixed stripper 26 serves to dislodge the tablet in case it should stick to either plunger. Finally, the plunger 22 retires to the position shown at station A.

If desired, in order to release the formed tablets at a more accurately timed point, the cams may be modified so that between stations C and D the formed tablets are retained between the plungers with a slight grip, the plungers separating quickly at station D to release the tablet.

When the slots 24 are shaped as indicated in FIG. 1, I find that, if the machine is run at a high speed, there is some tendency for the tablet to burst when the webs of stock connecting them are fractured by contact with the inner ends of the slots.

This tendency can be greatly minimized by utilizing slots of the configuration shown in FIGS. 8–10. As there shown, each slot has a knife edge 124 at its inner end. The knife edges localize the fracture in the webs of stock and greatly reduce, if they do not entirely obviate, the tendency of the filling to escape from the tablets when the webs are fractured. The slots 24 also have a chamfer 224 at their leading edges, so facilitating the passage of the webs of stock into the slots.

What I claim as my invention and desire to secure by Letters Patent is:

1. A moulding machine for forming a rope of sugar or like plastic material into individual seamless tablets, said machine comprising a rotary moulding wheel including a toothed portion having recesses between the teeth thereof and an adjoining moulding disc, said moulding disc containing a series of spaced throughgoing elongated moulding cavities arranged in a circle one opposite each of said recesses, each of said moulding cavities having an entry end adjoining said toothed portion and a discharge end and said moulding disc being formed with slots extending between and interconnecting adjacent moulding cavities at the entry ends thereof, said slots extending into said moulding portion from said cavity ends for part of the length of said cavities and terminating at inner ends within said cavities, a wheel situated opposite said toothed portion of the wheel and cooperating therewith to force the rope of sugar into said recesses to form said rope into roughly shaped tablets connected by thin webs of stock, a series of inner plungers and a series of outer plungers carried by said moulding wheel and mounted in pairs for reciprocating movement towards and away from one another, there being an inner plunger and an outer plunger opposite each moulding cavity, and a fixed cam system cooperating with said pairs of plungers in succession as said moulding wheel rotates first to cause successive transfer by said inner plungers of said partially moulded tablets from said recesses into said moulding cavities with the interconnecting webs of stock received within said slots, then to effect compression of said tablets within said moulding cavities while said webs of stock remain in said slots, then to effect further movement of said tablets into portions of said moulding cavities beyond said slots, whereby said webs of stock are broken by contact with the inner ends of said slots, and finally to discharge said tablets from the discharge ends of the moulding cavities after completion of moulding of said tablets.

2. A moulding machine according to claim 1, wherein each of said slots has a knife edge at its inner end.

3. A moulding machine according to claim 2, wherein each of said slots has an enlarged chamfered end opposite said toothed portion to facilitate the passage of said webs of stock into said slots.

References Cited in the file of this patent

UNITED STATES PATENTS

| | | |
|---|---|---|
| 1,967,565 | Thurlings | July 22, 1934 |
| 2,157,467 | Thurlings | May 9, 1939 |
| 2,865,311 | Thurlings | Dec. 23, 1958 |